United States Patent [19]
Durand et al.

[11] Patent Number: 5,093,102
[45] Date of Patent: Mar. 3, 1992

[54] PROCESS FOR THE PRODUCTION OF HIGH PURITY HYDROGEN BY CATALYTIC REFORMING OF METHANOL

[75] Inventors: Daniel Durand; Adrien Orieux, both of Rueil Malmaison; Philippe Courty, Houilles; Serge Mouratoff, Paris, all of France

[73] Assignee: Institut Francais Du Petrole, Rueil-Malmaison, France

[21] Appl. No.: 357,456

[22] Filed: May 26, 1989

[30] Foreign Application Priority Data

May 27, 1988 [FR] France ................. 8807195

[51] Int. Cl.⁵ .................. C01B 3/02; C01B 31/20
[52] U.S. Cl. .................. 423/648.1; 423/437
[58] Field of Search .............. 423/648.1, 437

[56] References Cited
U.S. PATENT DOCUMENTS 4,840,783  6/1989  Quang et al. ............ 423/648.1

FOREIGN PATENT DOCUMENTS 128202  7/1984  Japan .

*Primary Examiner*—Wayne A. Langel
*Attorney, Agent, or Firm*—Millen, White & Zelano

[57] ABSTRACT

The invention relates to a process for the production of hydrogen by steam reforming of methanol, in which water and methanol are reacted (4), under relatively high pressure, over a suitable catalyst. The gases emitted from the reaction are contacted (10), after condensation (7) under relatively high pressure, with an adsorption agent, such that the byproducts of the reaction are adsorbed and a hydrogen-rich gas is liberated (11). Also, byproducts which are recycled to the steam reforming reactor (4), are periodically desorbed under relatively low pressure at along with a fraction of the hydrogen present in the adsorption zone (10), after being submitted to recompression (13) and removal (14), under relatively high pressure, of at least a portion of carbon the dioxide, the desorbed gas fraction is recycled to the steam reforming reactor.

9 Claims, 1 Drawing Sheet

PROCESS FOR THE PRODUCTION OF HIGH PURITY HYDROGEN BY CATALYTIC REFORMING OF METHANOL

SUMMARY OF THE INVENTION

The present invention relates to a process for the production of hydrogen by catalytic steam reforming of methanol. This process allows production of hydrogen of high purity, up to 99.99% and with a yield, with respect to methanol, of up to or exceeding 95%, as defined hereinafter.

It is known that at the present time, the major part of the hydrogen used in the world originates from steam reforming or from partial oxidation of natural gas. The latter is not always available where it is required. Thus, for limited local use, it is preferable to use easily stockable liquid charges such as methanol.

Production of hydrogen from methanol is based on the well-known catalytic reforming reaction (FR 1,549,206 and 1,599,852) of methanol with steam:

$$CH_3OH + H_2O \rightleftharpoons CO_2 + 3H_2 \quad (1)$$

which can be considered to be the sum of:

$$CH_3OH \rightleftharpoons CO + 2H_2 \quad (2)$$

and $$CO + H_2O \rightleftharpoons CO_2 + H_2 \quad (3)$$

reaction (2) being the reverse of the synthesis reaction, and reaction (3) being that of conversion of CO and steam.

All these reactions are balanced.

Hydrogen yield, defined with respect to reaction (1), is defined by equation (4).

$$RH_2 (\%) = \frac{100 \cdot H_2}{3 \cdot CH_3OH} \quad (4)$$

in which $H_2$ and $CH_3OH$ are the number of gram molecules of hydrogen produced and of methanol reacted respectively.

Due to the microreversibility principle, known to the man skilled in the art, the steam reforming reaction of methanol can be carried out in the presence of any one of the catalysts already proposed for synthesis reactions of methanol.

$$CO + 2H_2 \rightleftharpoons CH_3OH \quad (5)$$

$$CO_2 + 3H_2 \rightleftharpoons CH_3OH + H_2O \quad (6)$$

The reforming process is carried out at temperatures generally between 150° and 350° C., preferably between 250° and 350° C., under pressures between 0.5 and 10 MPa, preferably between 1 and 5 MPa and with water/methanol molar ratios between 1 and 10 and preferably between 1.5 and 5. The process may be carried out in the gas phase or in the presence of a liquid phase comprised of, for example, a hydrocarbon or a hydrocarbon cut of specific weight between 0.65 and 0.90.

The catalyst of the reaction can be a conventional solid catalyst of high pressure synthesis of, for example, (Cr-Zn), or of low pressure synthesis, for example, copper coupled with zinc and/or iron and at least one metal M chosen from the aluminium and/or chromium group.

These catalysts are generally in the form of mixed oxides or a mixture of varying proportions of the simple constituent oxides. These catalysts can be conditioned either as mass elements, that is, comprised of oxides of the active elements, or as supported elements. In the latter case, their binding agents or supports can be for example silica, alumina, a mixture of these two materials, or a more complex material such as aluminates of a spinel structure (magnesium, zinc, iron or cobalt aluminate) or of perovskite structure (rare-earth aluminates of atomic numbers 57 to 71 inclusive), or may even consist of zircone-based mixed oxides ($ZrO_2$-MgO, rare-earth $ZrO_2$, etc.).

This catalytic steam reforming reaction of methanol for the production of hydrogen is generally carried out in the gas phase (Belgian patent No. 884,720, Japanese patent application No. 59-128202 and French patent application No. 86/17712), but it can also be carried out in the liquid phase (French patent application No. 87/02355). This reaction, according to the equations of reactions 1 and 2, gives rise to by-products of which the most important are carbon dioxide (about 25% volume) and carbon monoxide (about 0.5 to 3% volume).

Different systems for purification of hydrogen are generally proposed.

A system based on the principle of selective adsorption under pressure of the constituents of a gaseous mixture, other than hydrogen, in the presence of adsorbent masses (molecular sieve, active carbon, etc., which are usually regenerated at room temperature by depressurization and purge, is known (for example U.S. Pat. No. 4,553,981. To carry out the complete cycle continuously (generally called Pressure Swing Adsorption=PSA), two minimum adsorbent reactors are required: the first in the adsorption phase, whereas the second is operated according to the different regeneration phases.

This process has the advantage of producing an extremely pure hydrogen (for example, at least equal to 99.99%) and is perfectly adapted to the operating pressure (for example, 0.5 to 5 MPa) of the steam reforming process of methanol, as described in the present invention, for example. Nonetheless, hydrogen yield (percent hydrogen input/hydrogen output) is fairly low (70 to 80%) and is incompatible with the characteristics aimed at in the present invention (hydrogen yield with respect to the methanol charge at least equal to 95%). Furthermore, this yield decreases as a function of the operating pressure) from about 80% at 3MPa to about 70% at 1 MPa.

Other systems allow hydrogen to be purified, in particular by decarbonation of the gas by washing in a solvent (methanol, amines, etc.) followed by:
- either catalytic conversion of carbon monoxide (DE 3,332,314)
- or methanation and/or methanolation of carbon monoxides but only if their concentration is not too high (in the order of percent) (EP 1,394,243.

Association of these 3 systems allows hydrogen yield to be increased, to at least 95%, but unfortunately the purity of the hydrogen generally does not exceed 99.95% which is found to be insufficient for the various uses of the product.

In order to improve hydrogen yield (purity greater than 99.99%), Japanese patent No. 59 128202 proposes recycling of part of the PSA purge (hydrogen-rich purge) to the top of the reactor. This device allows an improvement of 10 to 15% in hydrogen yield with respect to the maximum yield (70 to 80%), indicated hereinabove for the PSA process coupled to steam reforming of methanol, without recycling the PSA purge.

Although it can lead to improved yield, but much lower than that described in the present invention application, this process presents the drawback of recycling large amounts of $CO_2$ in the reactor, which under the thermal conditions of the reaction acts as an inert gas and accumulates, leading to substantial decrease in catalyst activity.

The new process proposed by the applicant allows hydrogen of purity at least equal to 99.99% and hydrogen yield at least equal to 95% to be simultaneously obtained, even in the case where the steam reforming reaction of methanol is carried out at relatively low pressure, for example 0.8 to 2 MPa, although pressures in the order of 0.5 to 5 MPa can also be used in the isothermal or adiabatic reactor, with axial or radial flow, operated in the gas phase or in the presence of a liquid phase acting as a heat carrier.

The process, according to the present invention is defined as follows: production of hydrogen is carried out by catalytic steam reforming of methanol, by reacting under relatively high pressure methanol and water over a catalyst for conversion of methanol to hydrogen. The gaseous effluent emitted from the reaction, after condensation of part of the nontransformed reagents, is contacted with an adsorption agent under relatively high pressure, in such a way that the by-products including carbon dioxide are adsorbed and a hydrogen-rich gas is liberated. This adsorption reagent is regenerated cyclically under relatively low pressure, liberating hydrogen and the by-products adsorbed. This desorption gas mainly containing hydrogen and carbon dioxide is submitted to recompression then removal, under relatively high pressure, of at least a portion of the carbon dioxide, before being sent to the methanol steam reforming zone. Decarbonation (removal of $CO_2$) e.g., 80–100% of the $CO_2$ contained in the recycle gas can be carried out by washing with water and/or methanol from the charge or with an aqueous amine or alkanolamine solution, for example, an aqueous mono and/or diethanolamine solution. In the latter case, a twice-molar diethanolamine solution for example can be used to carry out gas washing under a pressure substantially equivalent to that of the methanol steam reforming reactor and at a temperature close to room temperature, for example, 0°–40° C. and 0.5 to 5 MPa. The solution obtained before recycling in the wash tower is regenerated by heating at a temperature between, for example, 60° and 140° C. before depressurization at a pressure close to atmospheric pressure. Under these conditions, the proportion of decarbonation of the gas can be between 95 and 99.9%.

In order to obtain the desired pressure, it is necessary to recompress the purge gases which are usually at 0.1–0.4 MPa.

In a perfected version of the above described process, the gaseous effluent of the decarbonation unit which contains, for example, 3 to 7% in volume of CO is treated in the conversion reactor at a low CO temperature, according to reaction (3) hereinabove. The gaseous effluent emitted from the CO converter is then recycled, to least in part, at the inlet to the methanol steam reforming reactor.

In this CO conversion reactor, containing a mass catalyst, copper-based coupled with zinc and/or iron and possibly aluminium and/or chromium, the operating temperature is between 160° and 300° C., preferably between 180° and 250° C., the pressure is between 0.5 and 10 MPa, preferably between 0.9 and 4.5 MPa and the $H_2O/CO$ molar ratio is between 1 and 30, preferably between 2 and 20. The water required for the steam reforming reaction of methanol, whose $H_2O/CH_3OH$ mass ratio at the inlet to the reactor is defined hereinabove, can be totally or partially introduced at the inlet to the CO conversion reactor before recycling—nonetheless, a small part can be purged.

This version of the process is perfected by operating conditions better adapted to conversion of CO: lower temperature, higher $H_2O/CO$ molar ratio, and lower $H_2$ and $CO_2$ content allow, by decreasing CO content by a few percent to less than 1000 ppm (parts per million), the hydrogen yield of the process to be increased according to reaction (3) hereinabove.

Adsorption is most often carried out under a total pressure of 0.5 to 5 MPa and a temperature of 20° to 50° C., for example.

Desorption (purge) is most often carried out under a total pressure of 0.1 to 0.4 MPa.

The totality of the purge gas can be recycled; nonetheless 90–99% is preferably recycled from which $CO_2$ is removed, as described hereinabove.

DETAILED DESCRIPTION OF THE DRAWINGS

Figure 1:
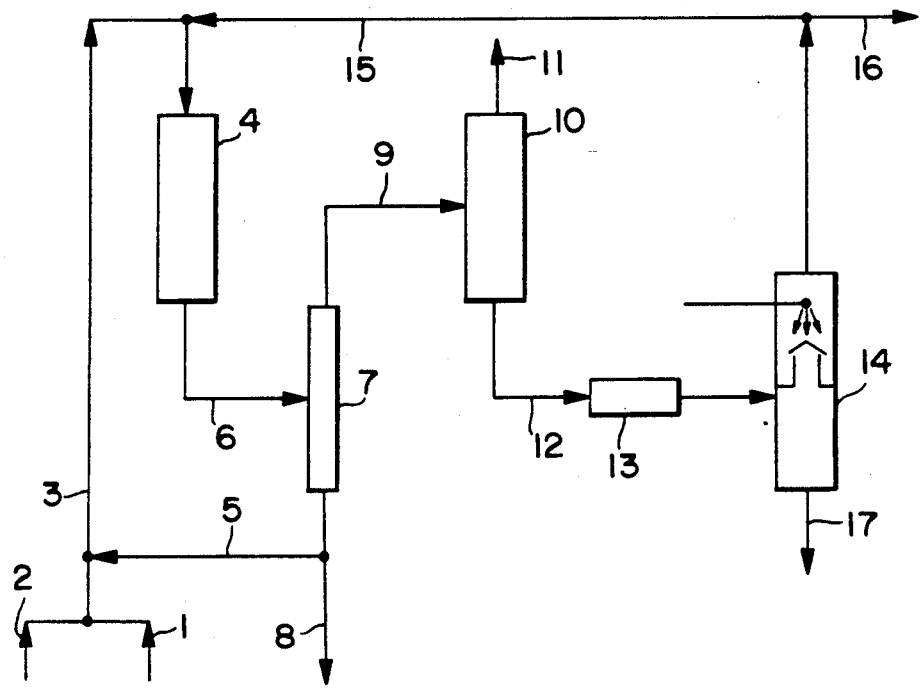
FIG. 1 describes one embodiment of the invention.

Methanol (1) and water (2) arrive in the reactor (4) by a pipe (3). The reactor (4) also receives a recycle (5) of unconverted methanol and water and recycled gases (15) from the decarbonator (14). The reactor effluent arrives by a pipe (6) to the condenser (7), at the base of which a condensate is collected, part of which (5) is recycled and the other part of which (8) is evacuated as purge. The noncondensed gases are sent by a pipe (9) to a PSA-type or similar adsorption device (10). Hydrogen of high purity is collected (11). The conversion gases are periodically sent to another adsorber, not drawn, and the adsorbent (purge) is regenerated by depressurization and sweeping of hydrogen. A purge flow (12) is thus collected which after passage in the compresser (13) arrives at a unit (14) for washing with amines comprising washing and regeneration of the amine solution. The gas, from which at least a major part of the $CO_2$ has been removed, is partly recycled (15) and partly discharged (16). After regeneration (removal of part of the $CO_2$), the amine solution is recycled in the washing unit (14).

Figure 2:
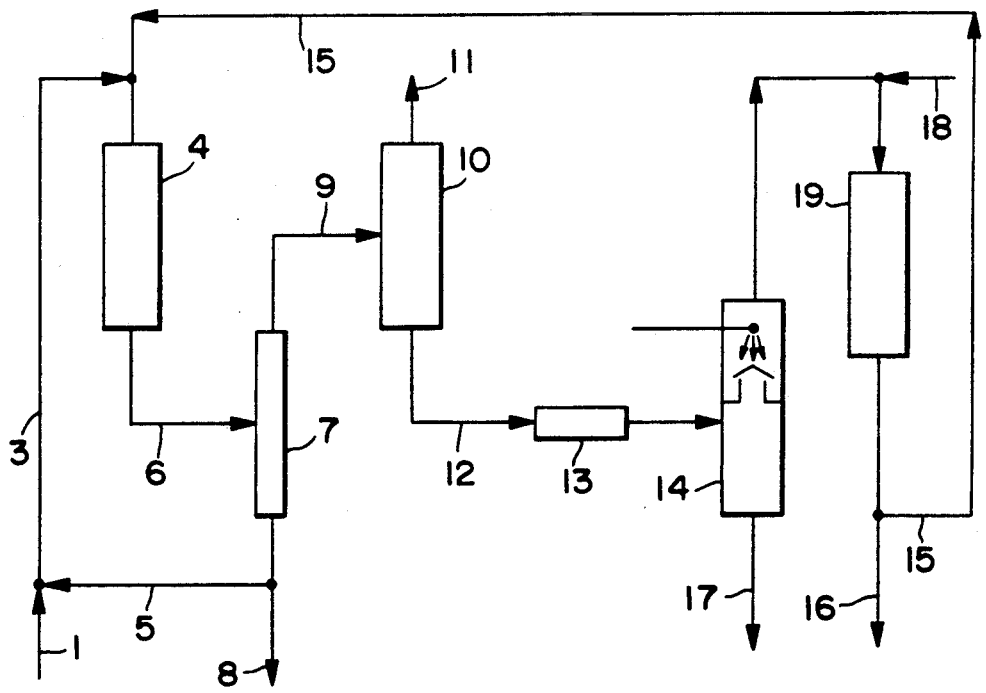
FIG. 2 describes a perfected embodiment of the invention.

FIG. 2 is comprised of the same elements as FIG. 1 with the following exception: the reaction water is partly or totally (totally in FIG. 2) introduced by pipe (18) instead of by pipe (2) and the decarbonated gas emitted from the washing unit (14) to which this water is added passes into the CO converter (19) before arriving at the pipes (15 and 16).

As a general rule, the purge (16) can represent 1 to 30%, preferably 1 to 10%, in volume of gas originating from the decarbonater The purge (8) represents, for example, 0.1 to 5% of the liquid effluent of the condenser (7), the complement being recycled (5).

The process of the invention thus presents the advantage of being able to produce both:
an extremely pure hydrogen (greater than 99.99%) with a yield greater than 95%, which allows the raw material to be economized (methanol).
even under relatively low pressure (about 1 MPa), which avoids the use of the special materials generally required to be able to work at higher pressures.

EXAMPLE 1 COMPARATIVE

The diagram is that of FIG. 1; nonetheless elements (13) to (17) are absent and the purge (12) is burned.

10.3 kmole/h of water and 10.25 kmole/h of methanol are injected into a tubular reactor containing 800 l of copper catalyst (for example, containing 40% in weight of copper, 24% in weight of Fe, 11% in weight of Cr). The pressure of the steam reforming reaction is maintained at 1 MPa and the temperature of the heat carrier at 270° C. Under these conditions, the rate of transformation of methanol is about 90%. After condensation, the nontransformed liquid reactants ($H_2O$, $CH_3OH$) are partly (99%) recycled in the reactor and partly (1%) drawn off as purge. The noncondensed gaseous effluents are separated by selective adsorption (PSA). With a recovery rate, for 99.99% pure hydrogen, of 70% at the oulet of the PSA, hydrogen yield (R) defined by the relationship:

$$R = \frac{nbr \text{ moles purified } H_2 \text{ (}PSA\text{ outlet)}}{3 \cdot nbr \text{ moles of methanol (contribution)}}$$

is 66%. The PSA purge (containing 30% of the hydrogen produced) is mixed with the gas which feeds the unit burners.

EXAMPLE 2 COMPARATIVE

The diagram is that of FIG. 1; nonetheless elements 14 and 17 are absent. The catalysts and the operating conditions in the steam reforming reactor are identical to those in example 1 except that, after compression, the hydrogen-rich fraction of the PSA purge is recycled, the rest being evacuated. This recycled fraction can represent about 40% in volume of the total purge and contains about 60% of the amount of hydrogen contained in this purge.

By thus proceeding, 99.99% pure hydrogen is obtained with a hydrogen yield of only about 83.2%.

Further, slightly faster deactivation of the catalyst (recapitulative table) is observed.

EXAMPLE 3 (FIG. 1)

The steam reforming reaction of methanol (4) and purification (10) of the hydrogen producd (by PSA) are carried out according to the operating conditions of example 1. However, the PSA purge (12), instead of being burned, undergoes recompression at 1.1 MPa (13) then washing (14) by an aqueous diethanolamine solution (4M) at 30° C. under 1.1 MPa to eliminate 99% of carbon dioxide (17) and is finally recycled (15), to about 95%, to the inlet to the reactor. 5% is thus eliminated as purge (16).

By thus proceeding, production of 99.99% pure hydrogen is obtained, with a hydrogen yield, with respect to methanol, of 95.1%.

EXAMPLE 4 (FIG. 2)

The steam reforming reaction of methanol and the steps for purification of hydrogen and decarbonation of the PSA purge are carried out according to the conditions in example 3. However, this decarbonated purge, which can contain 5 to 10% in volume of carbon monoxide, is sent under 1.1 MPa to a low temperature CO conversion reactor. This reactor (19) contains 150 kg of copper catalyst (for example 50% Cu, 4% Al, 25% Zn); 10.9 kmol of water are injected (18) in co-current to the purge gas. The CO conversion reaction is carried out under 1.05 MPa at an inlet temperature of 210° C., which allows conversion of 91% of CO. As in example 1, 95% of the gases emitted from the CO conversion reactor are recycled to the methanol steam reforming reactor, 5% of these gases are eliminated in the purge (16). By thus proceeding, yield (R) of 99.99% pure hydrogen is 95.9%.

RECAPITULATIVE TABLE

In the table below, hydrogen yields (R) (purity greater than 99.99%) for each of the examples described obtained during the steam reforming reaction of methanol under a pressure of 1 MPa, with or without total or partial recycling of the PSA purge, decarbonated or not, are reported.

Moreover, the temperatures required in the steam reforming reactor for production of the same amount of hydrogen (at 99.99% purity) with a transformation rate of methanol by pass after 100 and 1500 hours of functioning are also reported.

| Examples | Yield (R = $H_2/3CH_3OH$) of 99.99% pure hydrogen | Temperature (°C.) for conversion of 90% of methanol by pass | |
|---|---|---|---|
| | | after 100 h | after 1500 h |
| 1 | 66% | 280 | 285 |
| 2 | 81.2% | 275 | 285 |
| 3 | 95.1% | 270 | 275 |
| 4 | 95.9% | 270 | 275 |

The superiority of the results obtained (examples 3 and 4) is evident: better yield, less deactivation.

We claim:

1. A process for the production of hydrogen by catalytic steam reforming of methanol, comprising:
reacting water and methanol in a reaction zone over a methanol to hydrogen conversion catalyst;
contacting effluent from said reaction zone with an adsorption agent whereby byproducts of the reaction are adsorbed and a hydrogen-rich gas is formed, said byproducts comprising $CO_2$;
periodically desorbing adsorbed byproducts from said adsorption agent; and
recycling desorbed gas, containing at least part of said byproducts, to said reaction zone,
wherein said desorbed gas is submitted to recompression and subjected to $CO_2$ separation, such that 80-100% of $CO_2$ contained therein is separated from the remainder of said desorbed gas before at least a portion of said remainder of said desorbed gas is delivered to said reaction zone.

2. A process according to claim 1, wherein 90-99 vol. % of said recycled gas, from which $CO_2$ has been removed, is sent to said reaction zone.

3. A process according to claim 1, wherein said effluent of said reaction zone is cooled prior to being contacted with said adsorption agent whereby unreacted water and methanol are condensed and the condensed water and methanol are sent back to said reaction zone.

4. A process according to claim 1, wherein at least part of said recycled gas, after removal of $CO_2$, is contacted with a CO conversion catalyst before being sent back to said reaction zone.

5. A process according to claim 1, wherein said reaction of water with methanol and said contacting of effluent with said adsorption agent are carried out under 0.5-5 MPa, desorption is performed under 0.1-0.4 MPa, and removal of recycled $CO_2$ is conducted under 0.5-5 MPa.

6. A process according to claim 1, wherein removal of $CO_2$ is carried out by washing with a solvent, said solvent being water, monoethanolamine, diethanolamine, or their mixtures.

7. A process according to claim 1, wherein reaction of water with methanol is carried out in the presence of a liquid phase comprised of a hydrocarbon or a hydrocarbon cut having a specific weight of 0.65-0.90.

8. A process according to claim 1, wherein said reaction of water with methanol is carried out in the presence of a catalyst containing copper, zinc and/or iron and at least one metal M chosen from the aluminum and/or chromium group.

9. A process according to claim 4, wherein said desorbed gas, after recompression and removal of $CO_2$, is preheated, before being recycled, either to the temperature of the methanol steam reforming reactor or to the temperature of the CO conversion reactor.

* * * * *